3,257,319
COPOLYMERS OF 3-HYDROXYTETRAHYDRO-
THIOPHENE-1,1-DIOXIDE AND THEIR USE AS
OIL ADDITIVES
Russell H. Raines, St. Albans, and Frederick E. Bailey,
Jr., Charleston, W. Va., assignors to Union Carbide
Corporation, a corporation of New York
No Drawing. Filed Jan. 21, 1963, Ser. No. 252,597
11 Claims. (Cl. 252—48.6)

The invention relates to a novel class of copolymers and to the use of such copolymers as additives in lubricating oils. In a particular aspect, the invention relates to copolymers of unsaturated esters of 3-hydroxytetrahydrothiophene-1,1-dioxide, and to the use of said copolymers as additives in lubricating oils.

The copolymers of the invention contain as an essential ingredient a copolymerized ester of the formula

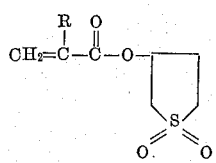

wherein R is hydrogen or methyl. This ester is copolymerized with one or more alkyl acrylates or methacrylates to produce the copolymers of the invention.

The unsaturated esters of 3-hydroxytetrahydrothiophene-1,1-dioxide that are employed in the invention can be produced by conventional methods. For instance, a convenient procedure involves the following steps:

(1) Sulfur dioxide is reacted with butadiene to produce 2,5-dihydrothiophene-1,1-dioxide, which in turn is (2) Hydrated in the presence of KOH to produce 3-hydroxytetrahydrothiophene-1,1-dioxide.

(3) The alcohol product of step (2) is transesterified with, for example, methyl acrylate or methyl methacrylate in the presence of titanium tetrabutoxide catalyst to produce the acrylic or methacrylic ester of 3-hydroxytetrahydrothiophene-1,1-dioxide. These esters are also named 3-sulfolanyl acrylate or methacrylate.

The copolymers of the invention also contain copolymerized alkyl acrylate and/or methacrylate. For instance, useful comonomers include methyl acrylate, ethyl acrylate, propyl acrylate, isopropyl acrylate, butyl acrylate, pentyl acrylate, hexyl acrylate, heptyl acrylate, 2-ethylhexyl and other octyl acrylates, nonyl acrylate, isodecyl and other decyl acrylates, undecyl acrylate, dodecyl acrylate, tridecyl acrylate, tetradecyl acrylate, pentadecyl acrylate, hexadecyl acrylate, heptadecyl acrylate, stearyl and other octadecyl acrylates, methyl methacrylate, isopropyl methacrylate, butyl methacrylate, hexyl methacrylate, 2-ethyloxy and other octyl methacrylate, decyl methacrylate, dodecyl methacrylate, stearyl methacrylate, and the like. Thus, alkyl esters of alpha, beta-unsaturated alkenoic acids having 3 or 4 carbon atoms, the alkyl moiety having from 1 to 18 carbon atoms, are useful comonomers in producing the polymers of the invention.

The proportion of the various monomers used for producing the novel copolymers can vary widely. In many cases, the end-use of the copolymer will dictate the nature and proportion of the monomers used. For instance, where the copolymer is to be used as an oil additive, it must be soluble in the oil. In this connection, major amounts of the 3-sulfonyl ester would be undesirable because the highly polar nature of the sulfone group reduces oil solubility. Therefore, an oil-solubilizing quantity of alkyl acrylate or methacrylate must be present in a copolymer used as an oil additive. This amount varies depending on the particular monomers, but in general it has been found that a copolymer having at least 85 weight percent, preferably 90 weight percent, and most preferably 95 weight percent, of alkyl acrylate or methacrylate wherein the alkyl moiety has from 8 to 18 carbon atoms, is oil-soluble (the percentages are based upon total weight of polymer). The remainder of the copolymer is either polymerized 3-sulfonyl acrylate or methacrylate, or a mixture of same with lower alkyl ($C_1$ to $C_7$) acrylate or methacrylate. In any case, at least 1 weight percent of the copolymer should be polymerized 3-sulfonyl acrylate or methacrylate.

When the copolymers of the invention are to be used in other applications, the end-use again will dictate the nature and proportion of the reagents. In general, at least 1 weight percent of the copolymer is polymerized 3-sulfonyl acrylate or methacrylate, with the remainder being polymerized alkyl acrylate or methacrylate. It is rare that more than 50 weight percent of the copolymer will be polymerized sulfonyl acrylate or methacrylate.

The copolymers of the invention can be prepared by conventional bulk, solution, or dispersion polymerization techniques. The preferred method is to polymerize the monomers in solution in the presence of a catalyst. The catalysts that can be used are well known and include, for example, diacetyl peroxide, benzoyl peroxide, tertiary-butyl hydroperoxide, di-t-butyl peroxide, dibenzoyl peroxide, cumene hydroperoxide, 1,1'-azodicyclohexane-carbonitrile, $\alpha,\alpha'$-azodiisobutyronitrile, and the like. The catalyst is employed in amounts of, for instance, 0.1 to 10 percent, and preferably 0.2 to 2 percent, based upon monomer weight. Solvents which can be employed for the polymerization reactions include acetone, benzene, cyclohexane, and the like. The temperature at which the polymerization reaction is carried out depends, in part, upon factors such as the initiation temperature of the catalyst, and the like. Generally, temperatures in the range of from about 30° C. to 100° C., and higher, have been found suitable. The polymerization time also depends, in part, upon various factors such as nature of reagents, temperature, nature and concentration of catalyst, and the like. Polymerization times within the range of from about 1 hour to about 125 hours, and preferably from about 5 hours to about 100 hours, have been found suitable.

The copolymer can be recovered by conventional methods. For instance, the copolymer solution can be precipitated by pouring it into a non-solvent such as methanol which causes the polymer to precipitate. The precipitate can then be washed with, for instance, methanol, after which the copolymer can be used.

The copolymers of the invention can have a wide range of molecular weights. A convenient way to characterize the molecular weight is to determine the reduced viscosity ($I_r$) of the copolymer. Reduced viscosity is defined as:

$$I_r = \frac{T - T_0}{T_0(c)}$$

in which T is the time required for a low concentrate copolymer solution to pass through a standard Ubbelohde viscometer, $T_0$ is the time for the pure solvent to pass through the viscometer, and c is the concentration of the copolymer in the solution in grams of copolymer per 100 milliliters of solvent. Unless otherwise specified, the reduced viscosities of the copolymers discussed herein were determined in a solution of 0.2 gram of copolymer per 100 milliliters of benzene at 30° C.

It has been found that useful copolymers can be prepared which have reduced viscosities in the range of from about 0.1 to about 5, preferably from 0.5 to 2.5, and most preferably from 0.75 to 2.0.

The copolymers of the invention that have reduced viscosities in the range of from 0.75 to 2.0 are most useful as oil additives to improve the viscosity index and dispersant characteristics of the oil. The oils contemplated are the hydrocarbon lubricating oils, which are well known in the art. A small amount of copolymer additive is used in the oil. For instance, desirable improvements in the properties of the oil are found with copolymer additive concentrations of from 0.1 weight percent, and lower, to 4 weight percent, and higher, the percentages being based on weight of oil. Preferred copolymer additive concentrations are found in the range of from about 0.5 to about 3 weight percent, and more preferably from about 0.65 to about 2.5 weight percent. Obviously, other known additives can be employed in the oil along with the copolymers of this invention. Examples are pour point depressants and extreme pressure agents.

The copolymers of the invention are also useful as dye-adjuvants for hydrophobic fibers, for producing molded articles, elastomers, and the like.

The following examples illustrate various aspects of the invention.

*Example 1*

A citrate bottle of about 375 milliliters capacity was flushed with nitrogen and charged with:

| | Grams |
|---|---|
| 3-sulfolanyl acrylate | 3.75 |
| Decyl acrylate | 21.25 |
| Dry acetone | 25.00 |
| Diacetyl peroxide as a 25 percent solution in dimethyl phthalate | 0.25 |

The bottle was reflushed with nitrogen, capped, and then placed in a bath which rotates the bottle end over end. The bath temperature was maintained at 30° C. for about 10 hours, and then increased to 50° C. for about 31.5 hours. The copolymer product was precipitated in methanol and dried at 50° C. The copolymer weighed 23.5 grams and had a reduced viscosity of 0.89.

*Example 2*

By a procedure analogous to that described in Example 1, a copolymer was produced from the following monomer charge:

| | Grams |
|---|---|
| 3-sulfolanyl acrylate | 2.5 |
| Decyl acrylate | 22.5 |
| Dry acetone | 25.0 |
| Diacetyl peroxide | 0.25 |

Reaction temperature was 50° C.
Reaction time was 95 hours.
Yield—23.9 grams.
Reduced viscosity—2.0.

*Example 3*

By a procedure analogous to that described in Example 1, a copolymer was produced from the following monomer charge:

| | Grams |
|---|---|
| 3-sulfolanyl acrylate | 1.25 |
| Decyl acrylate | 23.75 |
| Dry acetone | 25.0 |
| Diacetyl peroxide | 0.25 |

Reaction temperature—50° C.
Reaction time—94 hours
Yield—23.7 grams copolymer.
Reduced viscosity—1.45.

The copolymer of Example 3 (22.6 grams) was dissolved in benzene, and 40 grams of a Mid-Continent lubricating oil having a viscosity index of about 100 was added. The benzene was stripped off, and portions of the copolymer solution were added to more oil to yield the copolymer concentrations listed in Table I below. The viscosity indices of the various oil solutions were determined by test procedure ASTM D567–53.

TABLE I.—VISCOSITY INDEX OF LUBRICATING OIL

| Sample | Concentration of Copolymers, Wt. Percent | Viscosity Index |
|---|---|---|
| 1 | 0 | 100 |
| 2 | 0.75 | 147.3 |
| 3 | 1.5 | 149.1 |
| 4 | 2.0 | 149.9 |

In order to test for dispersant properties, the following procedure was used:

A sample of the copolymer/oil concentrate (1.11 grams-0.4 gram contained copolymer) was diluted to 100 grams with kerosene. A carbon paste, 4.5 grams consisting of 20% carbon black in oil, was weighed into a Waring blendor and 105 milliliters of the kerosene solution was added. After mixing for exactly 3 minutes, 50 milliliters of the dispersion was placed in a 50-milliliter graduate. If the dispersion remains homogeneous for 96 hours the test is successful. The copolymer of Example 3 was determined to be a dispersant.

What is claimed is:

1. A copolymer having a reduced viscosity in the range of from 0.1 to 5 determined in a solution of 0.2 gram of copolymer per 100 milliliters of benzene at 30° C., said copolymer comprising, in copolymerized form, (a) from 1 to 50 weight percent of an ester of the formula

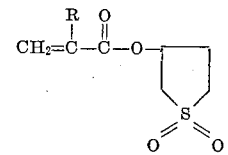

wherein R represents a member of the group consisting of hydrogen and methyl, and (b) the remainder of said copolymer being copolymerized alkyl ester of an alpha,beta-unsaturated alkenoic acid having from 3 to 4 carbon atoms, the alkyl moieties having from 1 to 18 carbon atoms.

2. A copolymer having a reduced viscosity in the range of from 0.1 to 5 determined in a solution of 0.2 gram of copolymer per 100 milliliters of benzene at 30° C., said copolymer comprising, in copolymerized form, (a) from 1 to 50 weight percent of 3-sulfolanyl acrylate, and (b) the remainder being alkyl acrylate wherein the alkyl moieties have from 1 to 18 carbon atoms.

3. A copolymer having a reduced viscosity in the range of from 0.1 to 5 determined in a solution of 0.2 gram of copolymer per 100 milliliters of benzene at 30° C., said copolymer comprising, in copolymerized form, (a) from 1 to 50 weight percent of 3-sulfolanyl acrylate, and (b) the remainder being decyl acrylate.

4. A copolymer having a reduced viscosity in the range of from 0.75 to 2 determined in a solution of 0.2 gram of copolymer per 100 milliliters of benzene at 30° C., said copolymer comprising, in copolymerized form, (a) an oil-solubilizing quantity of alkyl ester of alpha,beta-unsaturated alkenoic acid having from 3 to 4 carbon atoms, the alkyl moieties of which have from 8 to 18 carbon atoms, and (b) from 1 to 50 weight percent of an ester of the formula

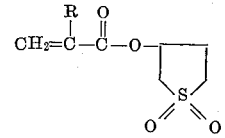

wherein R represents a member of the group consisting of hydrogen and methyl.

5. The copolymer of claim 4 wherein said copolymer also contains copolymerized $C_1$ to $C_7$ alkyl ester of alpha, beta-unsaturated alkenoic acid having from 3 to 4 carbon atoms.

6. A copolymer having a reduced viscosity in the range of from 0.75 to 2 determined in a solution of 0.2 gram of copolymer per 100 milliliters of benzene at 30° C., said copolymer comprising, in copolymerized form,
   (a) an oil-solubilizing quantity of decyl acrylate, and
   (b) the remainder being copolymerized 3-sulfolanyl acrylate, wherein said copolymer contains at least 1 weight percent of copolymerized 3-sulfolanyl acrylate.

7. A lubricating composition which comprises a mineral lubricating oil which contain a small amount sufficient to enhance the viscosity index of said mineral lubricating oil of a copolymer having a reduced viscosity in the range of from 0.75 to 2 determined in a solution of 0.2 gram of copolymer per 100 milliliters of benzene at 30° C., said copolymer comprising, in copolymerized form,
   (a) an oil-solubilizing quantity of alkyl ester of alpha, beta-unsaturated alkenoic acid having from 3 to 4 carbon atoms, the alkyl moieties of which have from 8 to 18 carbon atoms, and
   (b) from 1 to 50 weight percent of an ester of the formula

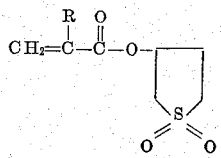

wherein R represents a member of the group consisting of hydrogen and methyl.

8. The lubricating composition of claim 7 wherein said copolymer also contains copolymerized $C_1$ to $C_7$ alkyl ester of alpha-beta-unsaturated alkenoic acid having from 3 to 4 carbon atoms.

9. A lubricating composition which comprises a mineral lubricating oil which contains a small amount sufficient to enhance the viscosity index of said mineral lubricating oil of a copolymer having a reduced viscosity in the range of from 0.75 to 2 determined in a solution of 0.2 gram of copolymer per 100 milliliters of benzene at 30° C., said copolymer comprising, in copolymerized form,
   (a) an oil-solubilizing quantity of decyl acrylate, and
   (b) the remainder being copolymerized 3-sulfolanyl acrylate, wherein said copolymer contains at least 1 weight percent of copolymerized 3-sulfolanyl acrylate.

10. The lubricating composition of claim 9 wherein at least 95 weight percent of said copolymer is copolymerized decyl acrylate.

11. The lubricating composition of claim 9 wherein said copolymer is present in an amount in the range of from 0.1 to 4 weight percent, based upon weight of lubricating oil.

References Cited by the Examiner
UNITED STATES PATENTS

| | | | |
|---|---|---|---|
| 2,430,821 | 11/1947 | Morris et al. | 260—332.1 |
| 2,449,173 | 9/1948 | Morris et al. | 260—332.1 |

DANIEL E. WYMAN, *Primary Examiner.*

L. G. XIARHOS, *Assistant Examiner.*